(12) United States Patent
Jenne et al.

(10) Patent No.: US 8,665,748 B2
(45) Date of Patent: Mar. 4, 2014

(54) METHOD FOR ENERGY EFFICIENT CONFIGURATION OF PORTS OF A LOGICAL COMMUNICATION CHANNEL

(75) Inventors: Nathan Stanley Jenne, Lincoln, CA (US); Shaun Kazuo Wakumoto, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 12/753,755

(22) Filed: Apr. 2, 2010

(65) Prior Publication Data
US 2011/0243032 A1 Oct. 6, 2011

(51) Int. Cl.
*H04L 12/26* (2006.01)
(52) U.S. Cl.
USPC .............................. 370/254; 370/230; 370/235
(58) Field of Classification Search
USPC .......................................................... 370/254
See application file for complete search history.

(56) References Cited

U.S. PATENT DOCUMENTS

| 7,623,455 | B2 * | 11/2009 | Hilla et al. | 370/232 |
|---|---|---|---|---|
| 2005/0276607 | A1 * | 12/2005 | Schunk | 398/135 |
| 2007/0201380 | A1 * | 8/2007 | Ma et al. | 370/254 |
| 2008/0304519 | A1 | 12/2008 | Koenen et al. | |
| 2009/0080328 | A1 * | 3/2009 | Hu et al. | 370/230 |
| 2009/0097391 | A1 * | 4/2009 | Diab et al. | 370/201 |
| 2009/0187683 | A1 * | 7/2009 | Adar et al. | 710/58 |
| 2010/0011230 | A1 | 1/2010 | Mater | |

OTHER PUBLICATIONS

Link Aggregation According to IEEE STANDARD802.3ad, Syskonnect GmbH, 2002, link aggregation according to IEEE 802.3ad, White paper, www.syskonnect.com.

Chamara Gunaratne; Ken Christensen; Bruce Nordman; Stephen Suen; Reducing the Energy Consumption of Ethernet with Adaptive Link Rate (ALR); http://ieeexplore.ieee.org/Xplore/login.jsp?url=http%3A%2F%2Fieeexplore.ieee.org%2Fstamp%2Fstamp.jsp%3Farnumber%3D4378356&authDecision=-203> Publication Date: Apr. 2008; vol. 57; On pp. 448-461.

Sergiu Nedevschi; Lucian Popa; Gianluca Iannaccone; Sylvia Ratnasamy; David Wetherall; Reducing Network Energy Consumption via Rate-Adaptation and Sleeping; http://www.eecs.berkeley.edu/Pubs/TechRpts/2007/EECS-2007-128.pdf> Publication Date: Oct. 29, 2007.

\* cited by examiner

*Primary Examiner* — Edan Orgad
*Assistant Examiner* — Emmanuel Maglo (57) ABSTRACT

A method for energy efficient configuration of a physical port of a plurality of physical ports of a network device is described herein. One or more physical ports of the plurality of physical ports may be aggregated to a logical port in a logical communication channel between the network device and another device. A configuration of the one or more physical ports is determined. The configuration includes one or more parameters which are monitored. The physical port of the plurality of physical ports is selected and a configuration state of the selected physical port is modified upon detection of an event based on the one or more parameters. The modified configuration state is one of an active port state, an active port state with a limited bandwidth utilization rate, and a standby port state. The selected port is reconfigured according to the modified configuration state.

18 Claims, 9 Drawing Sheets

METHOD FOR ENERGY EFFICIENT CONFIGURATION OF PORTS OF A LOGICAL COMMUNICATION CHANNEL

I. BACKGROUND

Link aggregation or trunking enables the connection of two networked devices, such as network devices, computers, end stations, etc., by grouping multiple physical network links between the devices into a single logical link. For example, administrators of a network aggregate several Ethernet links together into a link aggregation group (LAG) as defined in the IEEE 802.3ad standards. By setting up a LAG based on these standards, the network appears to run on a single Media Access Controller (MAC) that distributes and load balances the Ethernet packets between the group of physical links in the LAG.

Link aggregation provides for greater redundancy, such that if one of the physical network links fails, another physical network link of the same logical link may be used. Additionally, grouping multiple physical network links may increase the bandwidth capacity of the communications channel between the two devices and may provide load balancing over the physical links that are grouped together.

Typically, all the physical links that comprise the single logical link operate in a full or near-full power state. As such, the power consumption demands of the logical link may result in under-utilization of the bandwidth capacity when demand is low.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Link aggregation may be used to increase bandwidth for Ethernet connections by aggregating multiple physical ports to form a larger logical port. A physical port is a connection point for a network cable, such as an Ethernet cable, and two networked devices. As used herein, the term Ethernet is interpreted to be read broadly and to encompass local area networks and the protocols and standards used in local area networks. A physical port may include a various number of pins.

The logical port has multiple links, referred to herein as redundant links, which are grouped into a single connection such as a link aggregation group (LAG). Link aggregation groups may span from one switch to another, from a network interface card (NIC) to a switch, etc. Aggregation of the multiple links may be implemented in software, hardware, firmware, and the like. It is often the case where the usage of the links in a LAG may occur for peak demand (e.g., max loads, peak time of web surfing, backup, etc.). Where network systems include LAGs that are not fully used, such as during off-peak times of day, the port states of one or more physical ports may be modified to maximize energy efficiency.

A method for energy efficient configuration of a physical port of a plurality of physical ports of a network device is described herein. One or more physical ports of the plurality of physical ports may be aggregated to a logical port in a logical communication channel between the network device and another device. A configuration of the one or more physical ports is determined. The configuration includes one or more parameters which are monitored. The physical port of the plurality of physical ports is selected and a configuration state of the selected physical port is modified upon detection of an event based on the one or more parameters. The modified configuration state is one of an active port state, an active port state with a limited bandwidth utilization rate, and a standby port state. The selected port is reconfigured according to the modified configuration state.

Figure 1:
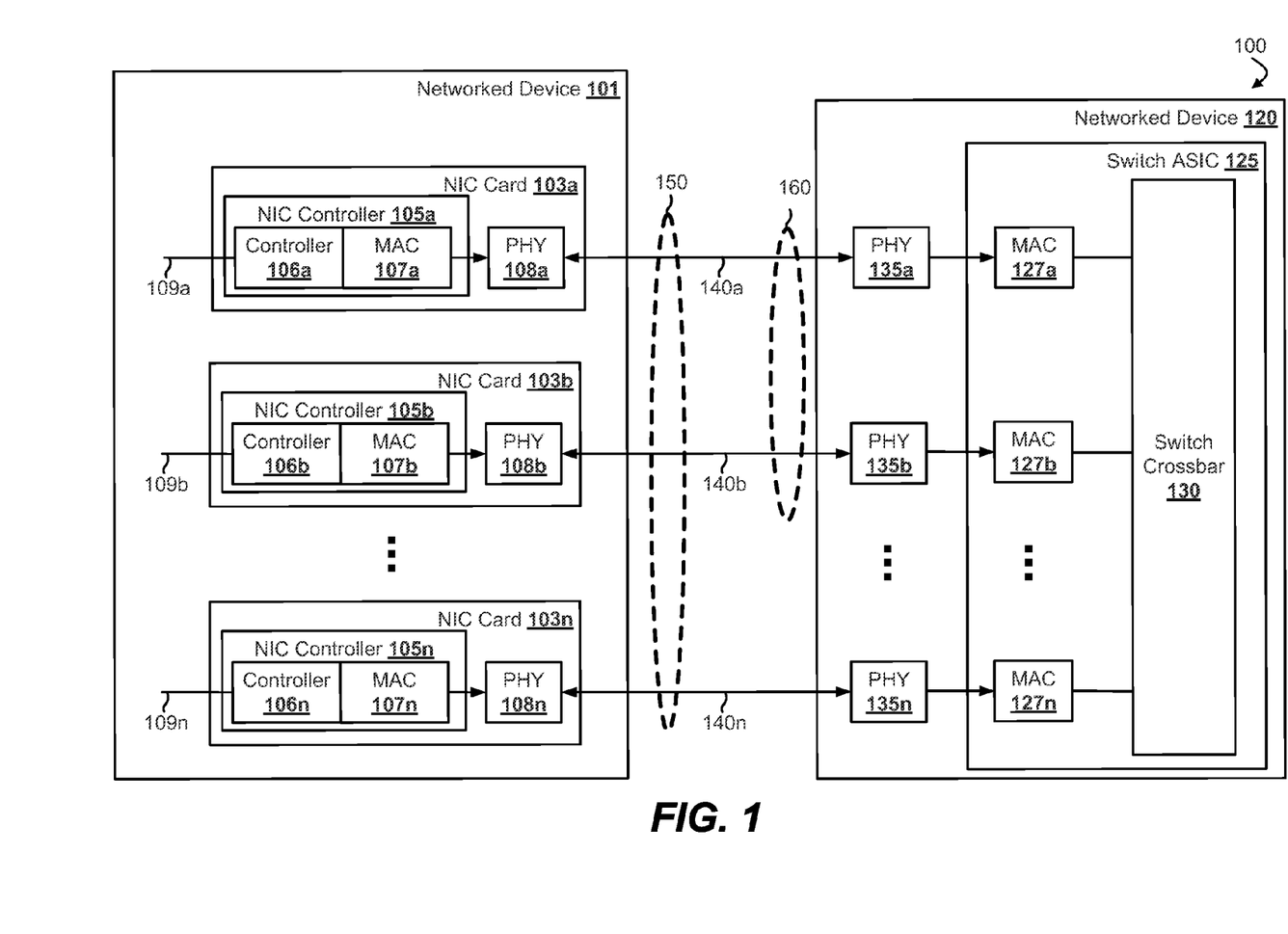
FIG. 1 is topological block diagram of a network system in accordance with an embodiment of the invention.

FIG. 1 is topological block diagram of a network system 100 in accordance with an embodiment of the invention. Network system 100 includes networked device 101, networked device 120, and network cables 140a-140n.

Networked device 101 is configured to transmit and receive data packets. For example, networked device 101 may be a server, end station, or other computer. Networked device 101 is operatively coupled to networked device 120.

Networked device 101 includes Network Interface Controller (NIC) cards 103a-103n. Each of NIC cards 103a-103n is configured to allow networked device 101 to communicate over the network system 100.

NIC card 103a includes NIC controller 105a and a PHY chip 108a. NIC card 103a includes a controller 106a and a media access controller (MAC) 107a, which is configured to translate instructions from the networked device 101. PHY 108a is operatively coupled to MAC 107a and network cable 140a and is configured to act as the physical interface that communicates with network cable 140a. Controller 106a is coupled to a peripheral component interconnect (PCI) bus 109a. PCI bus 109a is configured to transmit communications to and from NIC card 103a and networked device 101.

NIC card 103b includes NIC controller 105b and a PHY chip 108b. NIC card 103b includes a controller 106b and a media access controller (MAC) 107b, which is configured to translate instructions from the networked device 101. PHY 108b is operatively coupled to MAC 107b and network cable 140b and is configured to act as the physical interface that communicates with network cable 140b. Controller 106b is coupled to a PCI bus 109b. PCI bus 109b is configured to transmit communications to and from NIC card 103b and networked device 101.

NIC card 103*n* includes NIC controller 105*n* and a PHY chip 108*n*. NIC card 103*n* includes a controller 106*n* and a media access controller (MAC) 107*n*, which is configured to translate instructions from the networked device 101. PHY 108*n* is operatively coupled to MAC 107*n* and network cable 140*n* and is configured to act as the physical interface that communicates with network cable 140*n*. Controller 106*n* is coupled to a PCI bus 109*n*. PCI bus 109*n* is configured to transmit communications to and from NIC card 103*n* and networked device 101.

Networked device 120 is configured to process and transfer data in network system 100. Networked device 120 may be a network device such as a network switch, hub, router, etc. Networked device 120 is operatively coupled to networked device 101. Networked device 120 includes a switch application-specific integrated circuit (ASIC) 125 and PHYs 135*a*-135*n*. PHY 135*a* is configured to act as the physical interface that communicates with network cable 140*a*. PHY 135*b* is configured to act as the physical interface that communicates with network cable 140*b*. PHY 135*n* is configured to act as the physical interface that communicates with network cable 140*n*. Switch ASIC 125 includes a switch crossbar 130 and MACs 127*a*-127*n*. Each of MACs 127*a*-127*n* is configured to translate instructions from the networked device 120.

In operation, the communication links corresponding to network cables 140*a*-140*n* may be aggregated in a single logical communication channel 150. The configuration of one or more physical ports associated with the logical communication channel 150 may be optimized for energy efficiency. In one embodiment, an energy efficient configuration includes placing a physical port, such as one of physical ports of PHY 108*a*-108*n* and/or PHY 135*a*-135*n*, in a limited active state such that the port speed of the physical port is less than the full port capacity. In another embodiment, an energy efficient configuration includes placing one or more physical ports in a standby state such that the physical port(s) are not involved in the transmission of data packets. The limited active state and the standby state both provide energy savings over maintaining connectivity of all physical ports when the demand on the logical communication channel is low.

In general, devices, communication links, protocols, architectures, configurations, and other characteristics can vary from those illustrated herein. For example, other types of switch architectures may also be employed. Further, other configurations of networked devices 101 and 120 may be used.

The present invention can also be applied in other network topologies and environments. Network system 100 may be any type of network familiar to those skilled in the art that can support data communications using any of a variety of commercially-available protocols, including without limitation TCP/IP, SNA, IPX, AppleTalk, and the like. Merely by way of example, network system 100 can be a local area network (LAN), such as an Ethernet network, a Token-Ring network and/or the like; a wide-area network; a logical network, including without limitation a logical private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
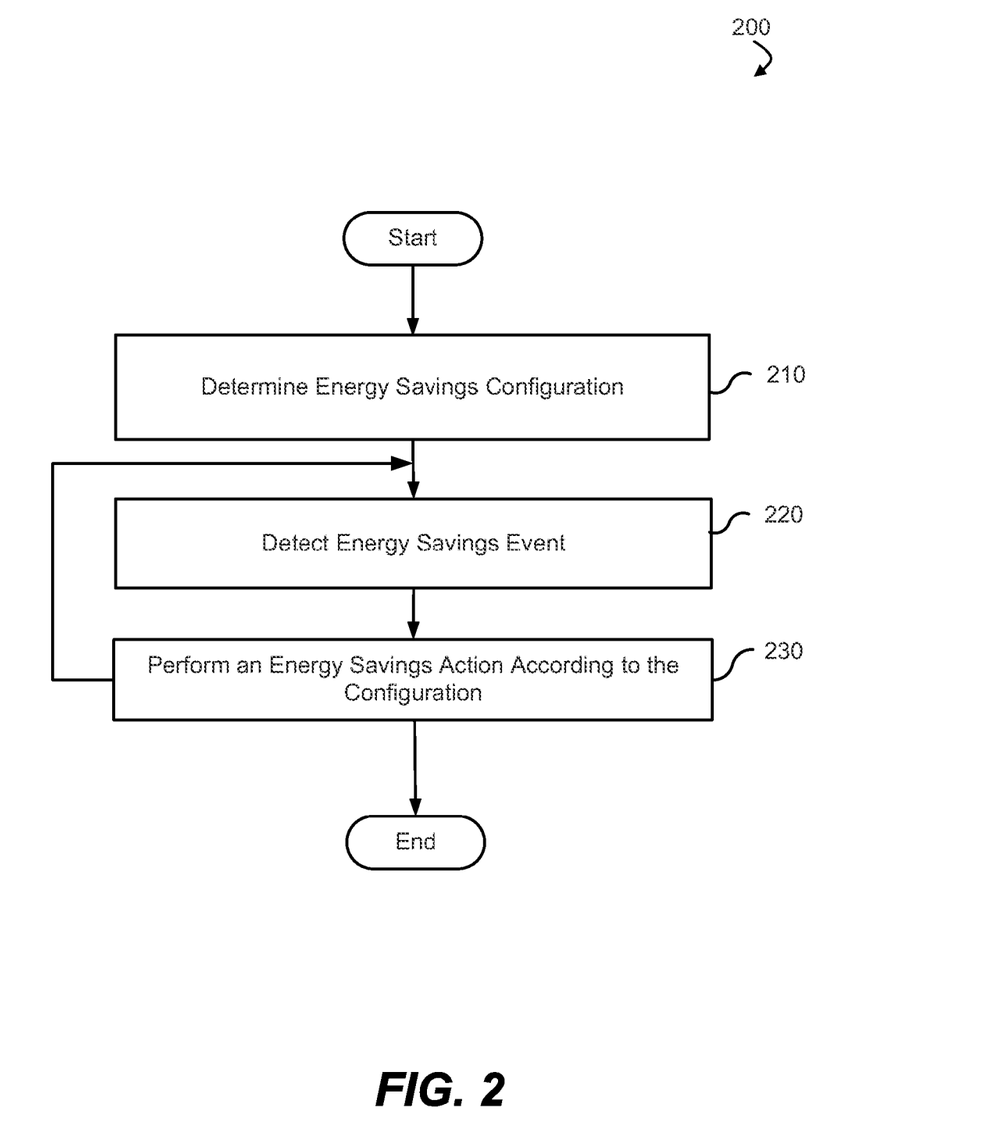
FIG. 2 is a process flow diagram for energy efficient configuration of redundant links in accordance with an embodiment of the invention.

FIG. 2 is a process flow diagram for energy efficient configuration of redundant links in accordance with an embodiment of the invention. The depicted process flow 200 may be carried out by execution of one or more sequences of executable instructions. In another embodiment, the process flow 200 is carried out by components of a networked device, an arrangement of hardware logic, e.g., an Application-Specific Integrated Circuit (ASIC), etc. For example, one or more steps of process flow 200 may be performed by an energy savings module of a network device (e.g., switch), a server, end station, or other computer.

A plurality of Ethernet links connecting two networked devices may be aggregated into a LAG, and forming a single logical communication channel. At step 210, an energy savings configuration is determined. In one embodiment, the energy savings configuration may specify an energy savings action to be performed, such as to place a physical port associated with the LAG in one of an active port state, a limited active port state, and a standby state. The energy savings configuration may be pushed down, for example, to a switch. In another embodiment, the switch may be preconfigured with the energy savings configuration.

The energy savings configuration may specify event-based parameters, the detection of which may cause the energy savings action to be performed. For example, the energy savings actions may be performed according to a predetermined time or frequency, such as based on a time of day, day of week, etc. In one embodiment, a network administrator may recognize that the usage of a corporate network is decreased during off-hours during the work week, weekends, and holidays. As such, the network administrator may specify energy savings actions to be performed upon detection of any one or more of the aforementioned events. Other parameters may include a threshold for detection of a small number of users of the network device, connectivity threshold(s), bandwidth utilization threshold(s), flow threshold(s), etc.

At step 220, an energy savings event is detected. For example, the energy savings module may detect that at least a portion of the corporate network is in the off-hours as specified in the configuration parameter. At step 230, an energy savings action is performed according to the configuration. For example, upon detection of the event, a physical port of the logical communication channel may be placed in a limited active port state, where port speed is limited. In another embodiment the physical port may be placed in a standby state. The port states are further described with regard to FIG. 8.

Connectivity

Figure 3:
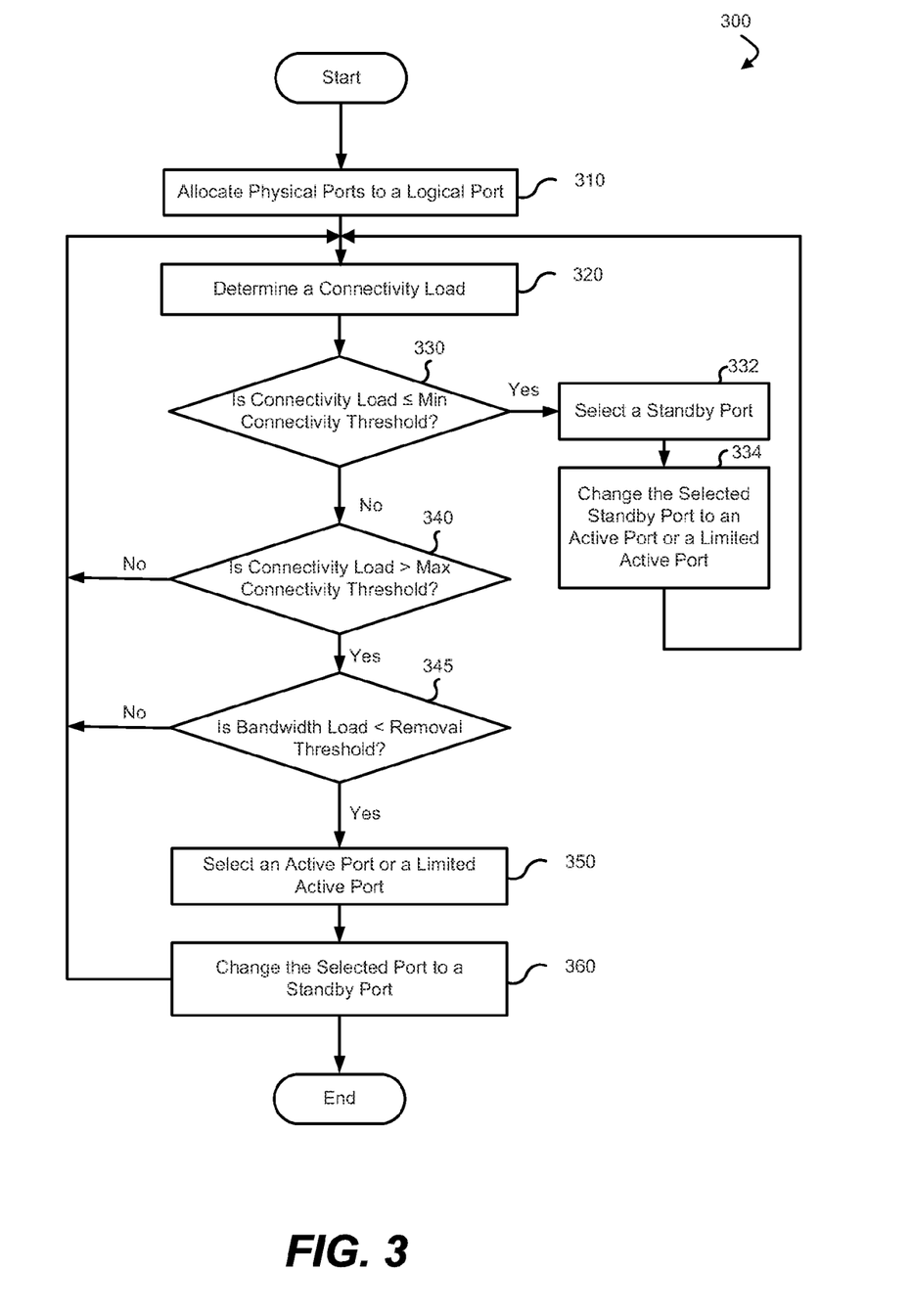
FIG. 3 is a process flow diagram for energy efficient configuration of redundant links based on connectivity load in accordance with an embodiment of the invention.

FIG. 3 is a process flow diagram for energy efficient configuration of redundant links based on connectivity load in accordance with an embodiment of the invention. The depicted process flow 300 may be carried out by execution of one or more sequences of executable instructions. In another embodiment, the process flow 300 is carried out by components of a networked device, an arrangement of hardware logic, e.g., an Application-Specific Integrated Circuit (ASIC), etc. For example, one or more steps of process flow 300 may be performed by an energy savings module of a network device (e.g., switch), a server, end station, or other computer.

At step 310, one or more physical ports are allocated to a logical port. For example, a plurality of Ethernet links may be aggregated into a LAG, forming a single logical communication channel. In one embodiment, ports in an active state, a limited active state, or a standby state are aggregated to a logical port. In one embodiment, once aggregated, the initial trunk members remain logical members of the trunk even when in a standby state. However, when in the standby state, the physical port may not be an active participant in the trunk. Event-based parameters, such as a maximum and minimum connectivity threshold, may be determined. At step 320, a connectivity load is determined. The connectivity load may measure a number of links in the logical communication channel or more specifically, a number of active links and/or limited active links in the logical communication channel.

The connectivity load is compared with a minimum connectivity threshold, at step 330. The minimum connectivity threshold may specify the minimum number of active links and/or limited active links for the logical communication channel, for example, to address the situation where the logical communication channel is communicatively isolated from the network. If the connectivity load is less than or equal to the minimum connectivity threshold, a standby physical port is selected at step 332. The selected standby physical port is changed to an active physical port or a limited active physical port at step 334. The connectivity load may again be determined and standby physical ports may be changed until the minimum connectivity threshold is satisfied.

At step 340, it is determined whether the connectivity load is greater than a maximum connectivity threshold. The maximum connectivity threshold may specify the maximum number of active links and/or limited active links for the logical communication channel, for example, to optimize energy efficiency of the network device.

If the connectivity load is greater than the maximum connectivity threshold, processing may continue to step 345, where it is determined if bandwidth load is less than a removal threshold. A bandwidth utilization load at the logical port is determined. The bandwidth utilization load may measure the ratio of the bandwidth being utilized for data transmission and the total bandwidth available in the logical communication channel or port. Other measures of bandwidth load may also be implemented. Event-based parameters, such as a removal threshold, may be determined. As used herein, the removal threshold specifies the bandwidth load for which certain physical ports are to be optimized for energy efficiency. For example, the bandwidth load may be very low, which may signal off-hours in a corporate network or otherwise low demand on the network. Where the bandwidth load is less than a removal threshold, processing continues to step 350, where an active physical port or a limited active physical port of the logical port is selected for purposes of energy efficiency.

At step 360, the selected physical port is changed to a standby physical port. The connectivity load may again be determined, for example, the connectivity load is less than the maximum connectivity threshold.

In one embodiment, port state changes may be made one port at a time. In another embodiment, a policy may be established to determine how many ports may have its port state changed for each iteration.

Bandwidth Utilization

Figure 4:
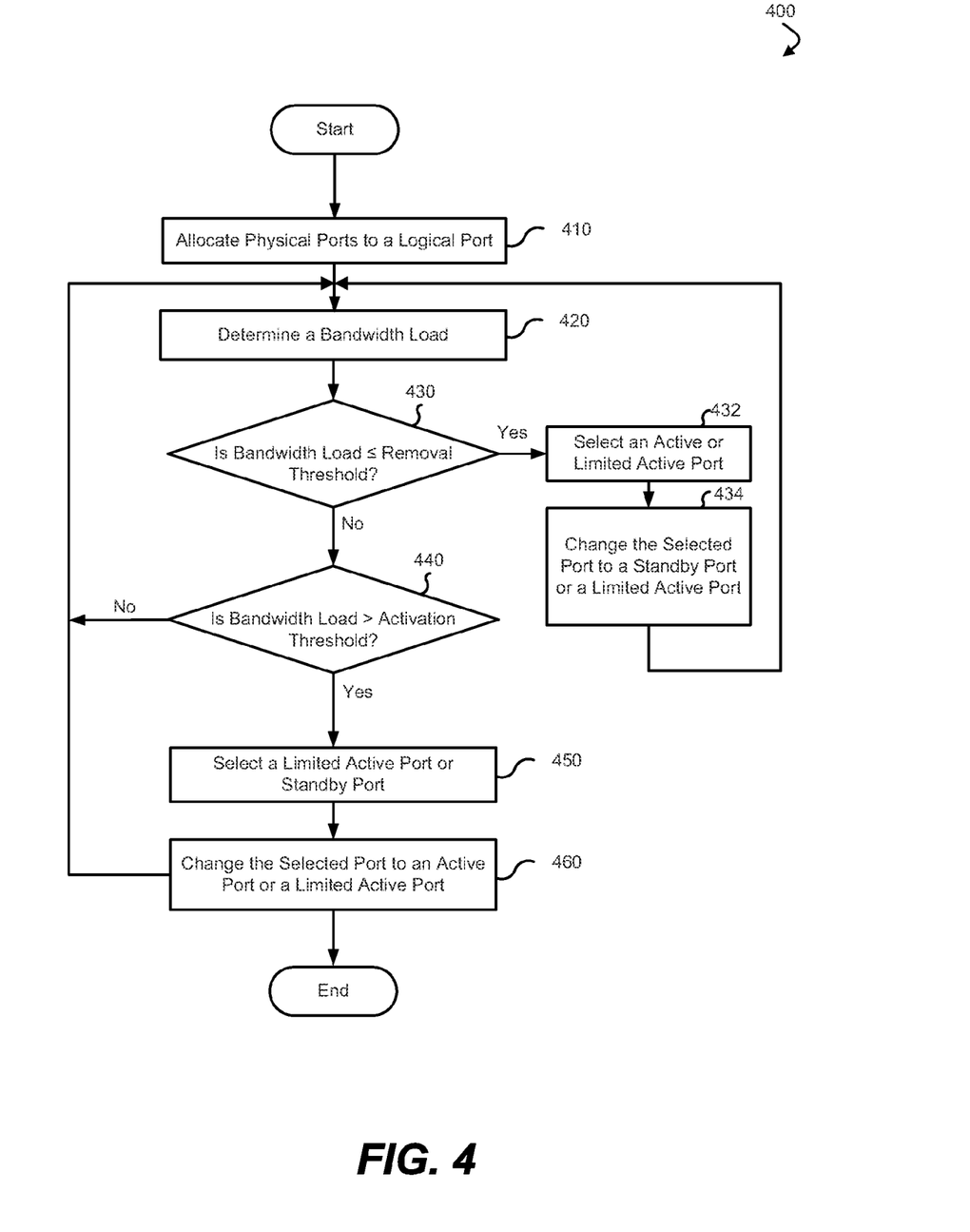
FIG. 4 is a process flow diagram for energy efficient configuration of redundant links based on bandwidth load in accordance with an embodiment of the invention.

FIG. 4 is a process flow diagram for energy efficient configuration of redundant links based on bandwidth load in accordance with an embodiment of the invention. The depicted process flow 400 may be carried out by execution of one or more sequences of executable instructions. In another embodiment, the process flow 400 is carried out by components of a networked device, an arrangement of hardware logic, e.g., an Application-Specific Integrated Circuit (ASIC), etc. For example, one or more steps of process flow 400 may be performed by an energy savings module of a network device (e.g., switch), a server, end station, or other computer.

At step 410, multiple physical ports are allocated to a logical port. A bandwidth utilization load at the logical port is determined at step 420. The bandwidth utilization load may measure the ratio of the bandwidth being utilized for data transmission and the total bandwidth available in the logical communication channel. Other measures of bandwidth load may also be implemented. Event-based parameters, such as an activation threshold and removal threshold, may be determined.

At step 430, it is determined whether the bandwidth load is greater than or equal to a removal threshold. As previously described, the removal threshold specifies the bandwidth load for which certain physical ports are to be optimized for energy efficiency. For example, the bandwidth load may be very low, which may signal off-hours in a corporate network or otherwise low demand on the network.

Where the bandwidth load is less than or equal to a removal threshold, an active physical port or limited active physical port is selected at step 432, for example, to optimize energy efficiency of the network device during a period of low demand. At step 434, the selected physical port is changed to a standby port, a limited active port, or a limited active port with a further reduced port speed. For example, if the selected port is an active port, the active port may be changed to a standby port or a limited active port. If the selected port is a limited active port, the limited active port may be changed to a standby port or may have its port speed further reduced by a value. The value may be an incremental value specified in the energy savings configuration. The bandwidth load may again be determined and selected ports may be changed until the bandwidth load is less than the removal threshold.

Where the bandwidth load is greater than an activation threshold, a limited active port or a standby port is selected at step 450, for example, to optimize performance of the network device.

At step 460, the selected port is changed to an active port or a limited active port. If the selected port is in the limited active port state, the selected port may remain in the limited active port but with an increased port speed. The bandwidth load may again be determined and selected ports may be changed. By activating standby ports or increasing the port speed of limited active ports in response to increasing demand on the network, the performance of the network device is improved.

Data Flows

Figure 5:
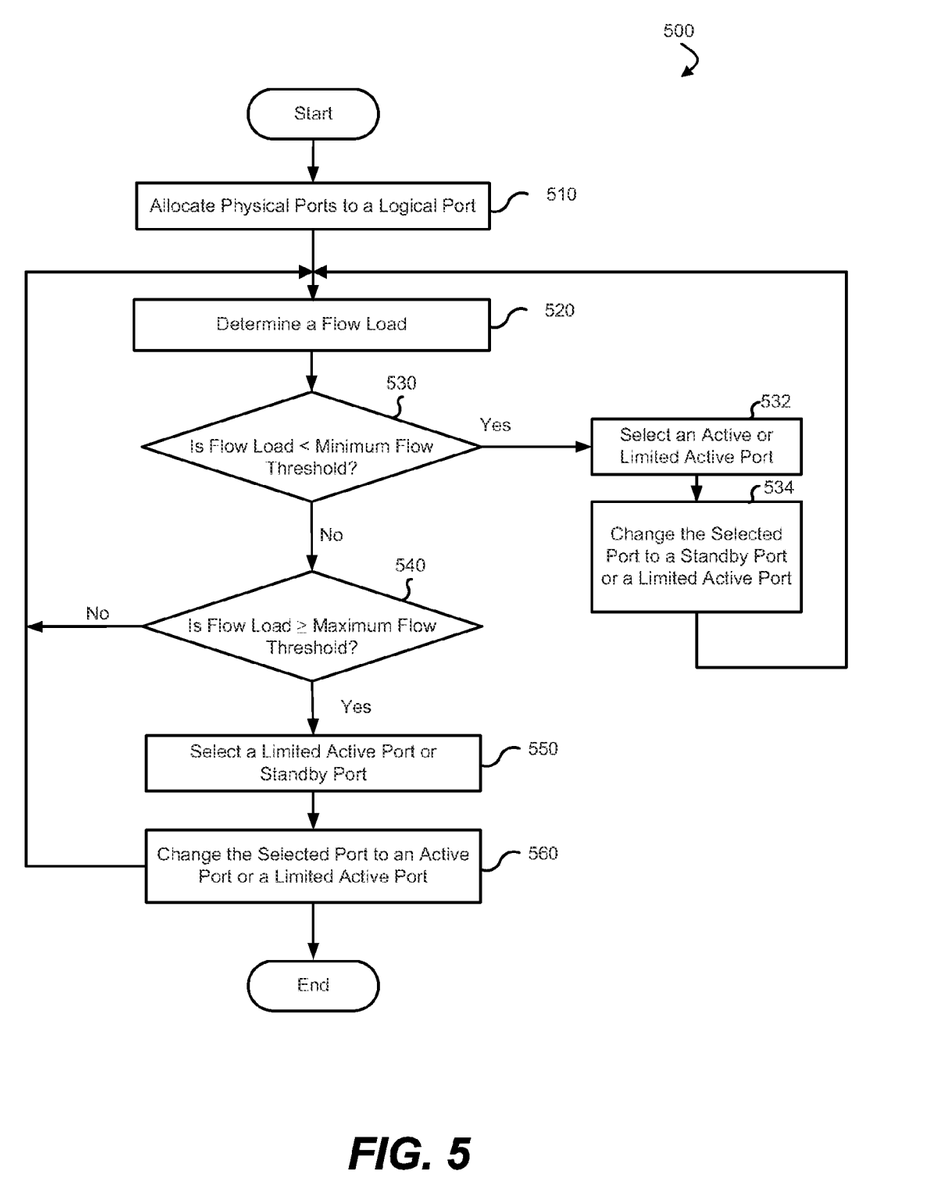
FIG. 5 is a process flow diagram for energy efficient configuration of redundant links based on flow load in accordance with an embodiment of the invention.

FIG. 5 is a process flow diagram for energy efficient configuration of redundant links based on flow load in accordance with an embodiment of the invention. The depicted process flow 500 may be carried out by execution of one or more sequences of executable instructions. In another embodiment, the process flow 500 is carried out by components of a networked device, an arrangement of hardware logic, e.g., an Application-Specific Integrated Circuit (ASIC), etc. For example, one or more steps of process flow 500 may be performed by an energy savings module of a network device (e.g., switch), a server, end station, or other computer.

A network system may support data communications in an internet protocol (IP) format. For such communications, data is transported in packets and a sequence of packets may be referred to as a packet flow. Within network devices, such as switches and routers, one or more packet flows may be assigned to communication links of the network device. Energy efficiency methods may be implemented at redundant ports based on a number of packet flows being serviced by the redundant port.

At step 510, one or more physical ports are allocated to a logical port. A flow load at the logical port is determined at step 520. The flow load may measure the number of packet flows being serviced by a physical port of the logical port (i.e., redundant port). Other measures of flow load may also be implemented. An event-based parameter, such as a maximum flow threshold, may be determined.

At step 530, it is determined whether the flow load is less than a minimum flow threshold. As used herein, the minimum flow threshold specifies the flow load for which physical ports are to be removed from the logical port or otherwise optimized for energy efficiency, such as by placing the ports in a mode whereby the port consumes less energy. For example, if the flow load for a physical port falls below the minimum flow threshold, processing may continue to step 532.

At step 532, an active physical port or limited active physical port is selected, for example, to optimize energy efficiency of the network device. In one embodiment, the physical port being monitored for flow load is the selected port.

At step 534, the selected physical port is changed to a standby port, a limited active port, or a limited active port with a further reduced port speed. The flow load may again be determined and selected ports may be changed until the flow load is more than the minimum flow threshold.

Where the flow load is greater than the minimum flow threshold, processing continues to step 540, where it is determined whether the flow load is greater than or equal to the maximum flow threshold. Processing continues to step 550 if the flow load is greater than or equal to the maximum flow threshold. Otherwise, processing may continue to step 520. At step 550, a limited active port or a standby port are selected, for example, to optimize performance of the network device.

At step 560, the selected port is changed to an active port or a limited active port. If the selected port is in the limited active port state, the selected port may remain in the limited active port but with an increased port speed.

Physical Port Selection

Port selection may be based on one or more attributes of the networked device which includes the physical port.

Figure 6:
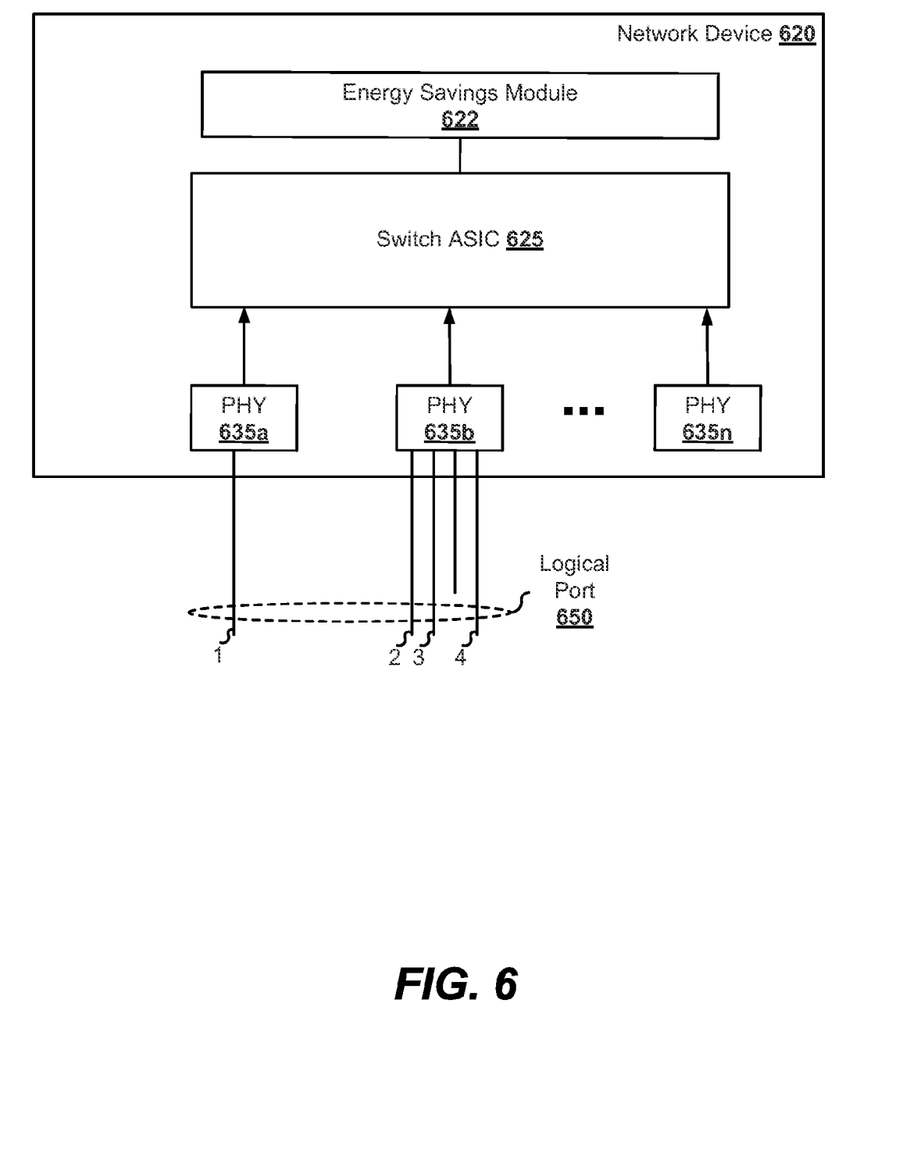
FIG. 6 is block diagram of a network device with multiple ports grouped in a logical port in accordance with an embodiment of the invention.

FIG. 6 is block diagram of a network device 620 with multiple ports grouped in a logical port in accordance with an embodiment of the invention. Network device 620 includes a switch application-specific integrated circuit (ASIC) 625 and PHYs 635a-635n. PHYs 635a-635n may support multiple physical ports. In one embodiment, PHY 635a supports one physical port and PHY 635b supports four physical ports. A physical port 1 of PHY 635a and physical ports 2-4 of PHY 635b are aggregated into a single logical port 650. Network device 620 further includes an energy savings module 622 which is configured to perform energy efficient configuration of physical ports aggregated into a logical port.

In operation, a physical port may be selected by energy savings module 622 for optimizing either energy efficiency and/or performance of the network device. For example, the selection of the physical port may be performed at steps 332 and 350 of FIG. 3, steps 432 and 450 of FIG. 4, and steps 532 and 550 of FIG. 5.

In one embodiment, a port may be selected for maximization of energy efficiency, such as during low demand times on a network. The selected port is a physical port which has been aggregated in a logical port. Moreover, the selected port is a physical port supported by a PHY chip which does not support other physical ports that are in an active or limited active state. For example, logical port 650 is a four-port trunk. Port 1 may be selected since PHY 635a does not include other ports in logical port 650 and there are no other ports (whether or not a member of the trunk) in the active state on PHY 635a. As such, PHY 635a may be powered down, placed in a sleep mode, or otherwise disabled to further reduce energy consumption by network device 620.

In another embodiment, a port may be selected for maximization of performance of the network device. For example, during times of increased network demand, a standby port or a limited active port may be selected and changed to a port state which better serves the network demand. The selected port is a physical port of a PHY chip which includes other physical ports that are aggregated in any logical port. For example, logical port 650 is a four-port trunk. Port 1 and port 2 may have been previously placed in a standby state and PHY 635a may have been disabled. When an increase in network demand (e.g., increase in connectivity load, bandwidth load, and/or flow load) is detected, one of ports 1 and 2 may be selected. To choose between ports 1 and 2, it may be recognized that port 2 is a part of PHY 635b, which includes other physical ports in the logical port. Moreover, port 1 is a part of PHY 635a, which does not include other ports in any logical port. To maximize energy efficiency while increasing performance of the network device, port 2 may be selected since PHY 635b is already enabled to service other ports. As such, PHY 635a may remain disabled.

Figure 7:
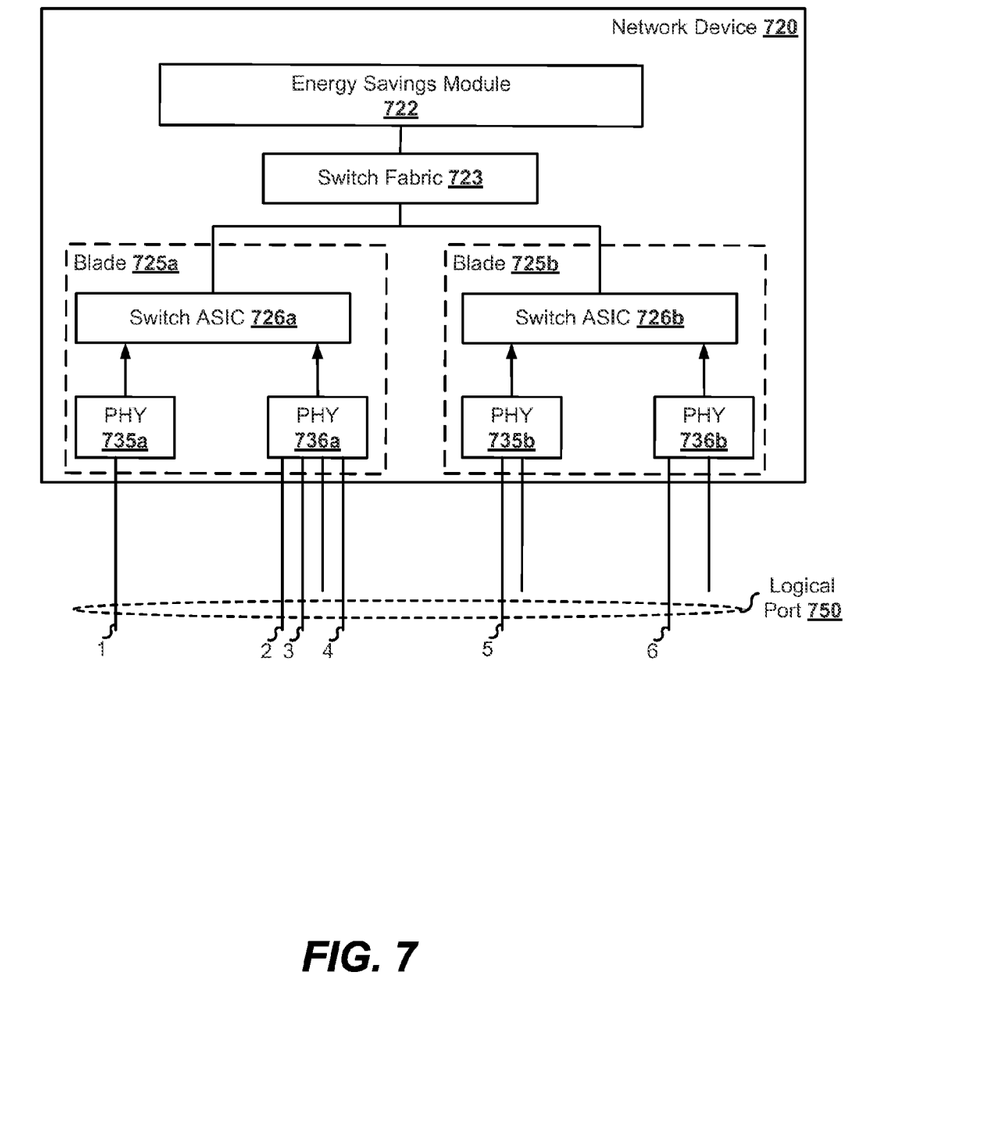
FIG. 7 is block diagram of a network device with multiple ports of multiple blades grouped in a logical port in accordance with an embodiment of the invention.

FIG. 7 is block diagram of a network device 720 with multiple ports of multiple blades grouped in a logical port in accordance with an embodiment of the invention. Network device 720 includes an energy savings module 722, a switch fabric 723, a blade 725a, and a blade 725b. Blade 725a includes an application-specific integrated circuit (ASIC) 726a and PHYs 735a-736a. Blade 725b includes ASIC 726b and PHYs 735b-736b.

PHYs 735a-735b and 736a-736b may support multiple physical ports. In one embodiment, logical port 750 is a six-port trunk comprised of a physical port 1 supported by PHY 735a, physical ports 2-4 supported by PHY 736a, a physical port 5 supported by PHY 735b, and a physical port 6 supported by PHY 736b.

In operation, a physical port may be selected by energy savings module 722 for optimizing either energy efficiency and/or performance of the network device. For example, the selection of the physical port may be performed at steps 332 and 350 of FIG. 3, steps 432 and 450 of FIG. 4, and steps 532 and 550 of FIG. 5. Port selection may be based on one or more attributes of the networked device which houses the physical port.

In one embodiment, a port may be selected for maximization of performance of the network device. For example, during times of increased network demand, a standby port or a limited active port may be selected and changed to a port state which better serves the network demand. The selected port may be a physical port of a blade which includes an inactive ASIC. As used herein an inactive ASIC is an ASIC which has one or more portions in sleep mode, disabled, powered-down, or otherwise not in an active state. For example, ports 1, 2, 5, and 6 of logical port 750 have been previously placed in a standby state and switch ASIC 726b has been disabled.

It is recognized that an ASIC is a bottleneck with regard to bandwidth. Selection techniques may attempt to activate as many ASICs as possible to reduce the bottleneck. For example, when an increase in network demand (e.g., increase in connectivity load, bandwidth load, flow load, etc.) is detected, one of ports 1, 2, 5, and 6 may be selected. To choose among these ports, it is observed that ports 5 and 6 are a part of blade 725b, which includes a disabled ASIC 726b. To maximize performance of network device 720, one of ports 5 and 6 may be selected and switch ASIC 726b may be enabled. The selection between ports of the same blade may be made according to various techniques.

Physical Port State

Figure 8:
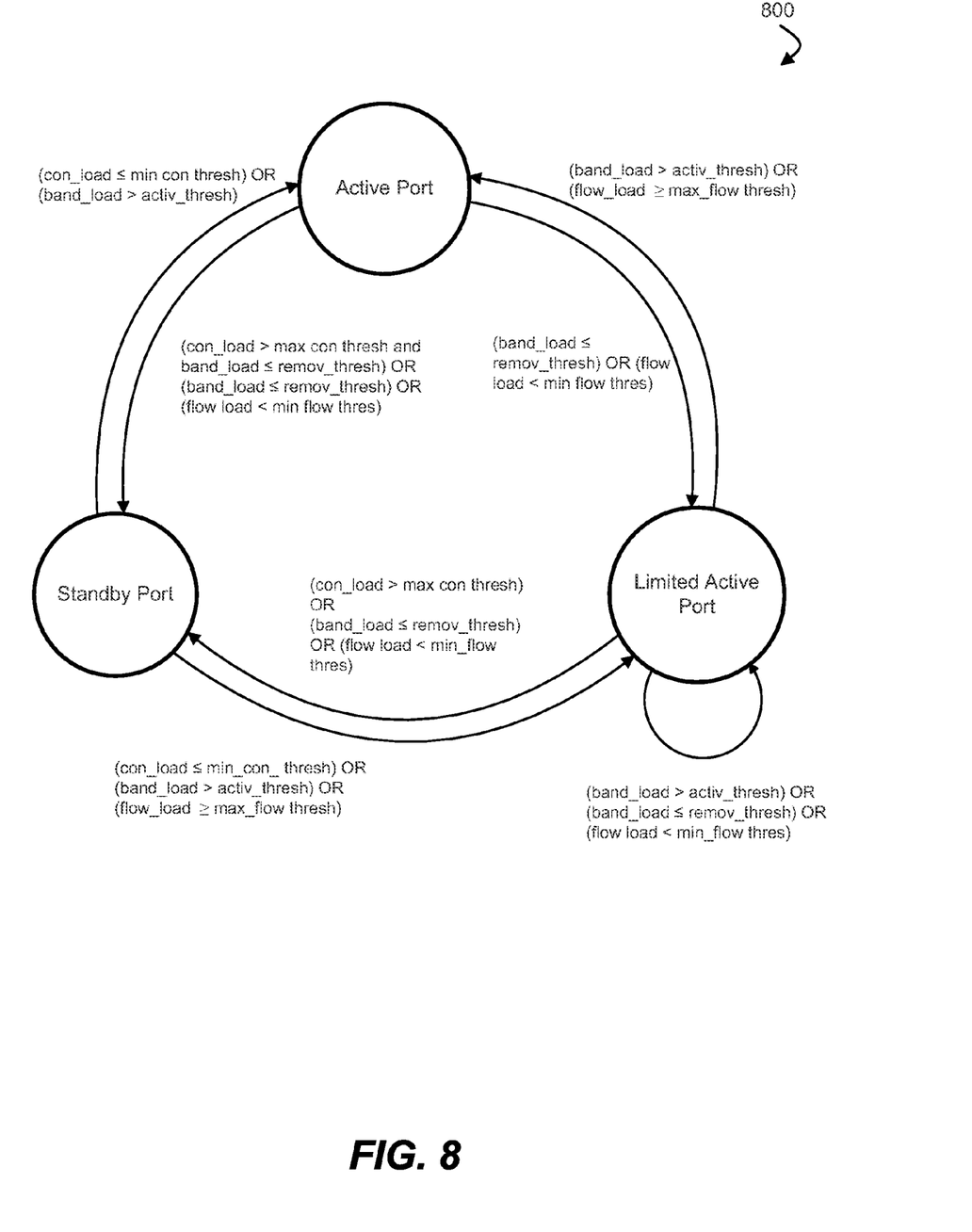
FIG. 8 is a state diagram for energy efficient configuration of redundant links in accordance with an embodiment of the invention.

FIG. 8 is a state diagram 800 for energy efficient configuration of redundant links in accordance with an embodiment of the invention. Two networked devices may be operatively coupled thereto via a network cable. Physical ports of each of the networked devices are connection points for the network cable. Multiple physical ports of one of the networked devices may be aggregated on to a single logical port.

As described herein, a physical port of the device may be configured for optimal energy efficiency. Physical ports may transition among three configuration states: an active port state, a limited active port state, and a standby port state. An active port state includes a physical port that is actively involved in the transmission of data packets and that has an unlimited inbound and/or outbound bandwidth limit. In another embodiment, the physical port in the active port state may be further configured to receive data packets.

A limited active port state includes a physical port that is actively involved in the transmission of data packets and that has a limited inbound and/or outbound bandwidth limit. As such, a physical port in the limited active port state may have a port speed that is less than a full port speed. For example, in the limited active port state, the physical port may be configured with an outbound bandwidth limit of 90 percent of the full port speed. Where the full port speed is 100 Mb/s, the outbound traffic from the port is limited to 10 Mb/s. Where the full port speed is 1000 Mb/s, the access layer uplinks may be limited to 100 Mb/s. In another embodiment, the physical port in the limited active port state may be further configured to receive data packets. In one embodiment, the port speed is consistent across all enabled ports (e.g., active ports and limited active ports) in the trunk due to the way load-balancing operates. As such, all enabled ports in the trunk may have the same bandwidth limitations.

A standby port state includes a physical port that is not involved in the transmission of data packets. In another embodiment, the physical port in the standby state may be further configured to not receive or transmit data packets.

A physical port or a link of the physical port may transition from state to state based on a comparison of a port metric to a threshold. For example, a state change from active port to limited active port may take place where the bandwidth load of the physical port is less than or equal to the removal threshold, or where the flow load of the physical port is less than the minimum flow threshold. A state change from limited active port to active port may take place where the bandwidth load is greater than the activation threshold or where the flow load is greater than or equal to a maximum flow threshold.

A state change from active port to standby port may take place where the connectivity load of the physical port is greater than the maximum connectivity threshold and the bandwidth load of the physical port is less than or equal to the removal threshold, where the bandwidth load of the physical port is less than or equal to the removal threshold, or where the flow load of the physical port is less than the minimum flow threshold. A state change from standby port to active port may take place where the connectivity load of the physical port is less than or equal to the minimum connectivity threshold or the bandwidth load of the physical port is greater than the activation threshold.

A state change from limited active port to standby port may take place where the connectivity load is greater than the maximum connectivity threshold, the bandwidth load of the physical port is less than or equal to the removal threshold, or where the flow load of the physical port is less than the minimum flow threshold. A state change from standby port to limited active port may take place where the connectivity load of the physical port is less than or equal to the minimum connectivity threshold, the bandwidth load of the physical port is greater than the activation threshold, or where the flow load is greater than or equal to a maximum flow threshold.

In the limited active port state, an increase or decrease in port speed may be performed where bandwidth load is greater than an activation threshold, the bandwidth load is less than or equal to a removal threshold, or a flow load is less than a minimum flow threshold.

In other embodiments, one or more components of the networked device (e.g., server, switch, etc.) can be put in a standby state when the physical port or link is placed in the standby state or put in a limited active state when the physical port or link is placed in the limited active state. For example, a Network Interface Controller (NIC) and/or a MAC of a NIC card, PHY components, portions of an ASIC, PCI bus, and/or PCI interface may be powered-down, bandwidth limited, or disabled. In another embodiment, hardware linked to the physical port that is in a standby mode is disabled.

Figure 9:
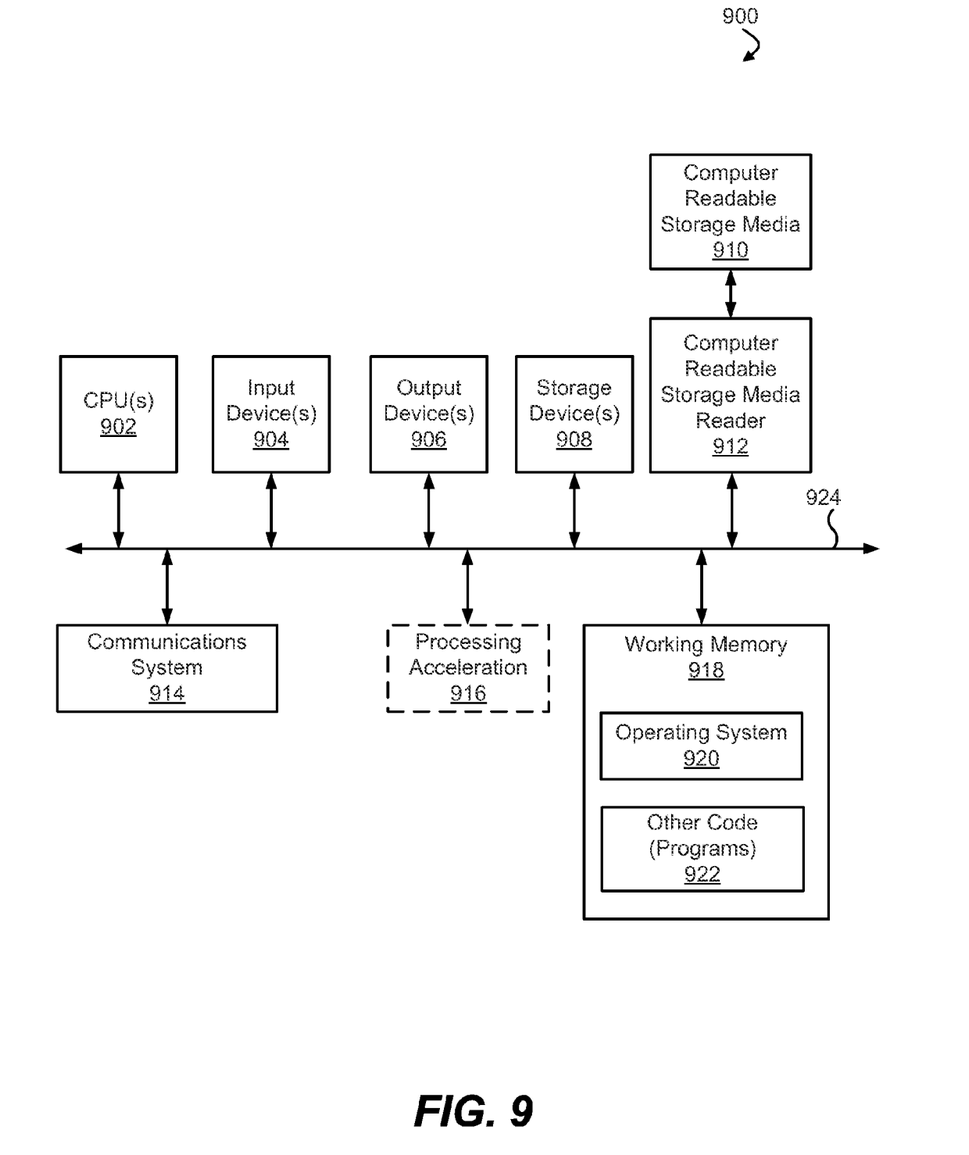
FIG. 9 illustrates an exemplary computer system in which various embodiments of the present invention may be implemented.

FIG. 9 illustrates an exemplary computer system 900 in which various embodiments of the present invention may be implemented. The system 900 may be used to implement any of the computer systems described above. The computer system 900 is shown comprising hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). The computer system 900 may also include one or more storage devices 908. By way of example, the storage device(s) 908 can include devices such as disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 912, a communications system 914 (e.g., a modem, a network card (wireless or wired), an infra-red communication device, etc.), and working memory 918, which may include RAM and ROM devices as described above. In some embodiments, the computer system 900 may also include a processing acceleration unit 916, which can include a digital signal processor DSP, a special-purpose processor, and/or the like.

The computer-readable storage media reader 912 can further be connected to a computer-readable storage medium 910, together (and in combination with storage device(s) 908 in one embodiment) comprehensively representing remote, local, fixed, and/or removable storage devices plus storage media for temporarily and/or more permanently containing, storing, transmitting, and retrieving computer-readable information. The communications system 914 may permit data to be exchanged with the network and/or any other computer described above with respect to the system 900.

The computer system 900 may also comprise software elements, shown as being currently located within a working memory 918, including an operating system 920 and/or other code 922, such as an application program (which may be a client application, Web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for storing a plurality of instructions, or portions of instructions, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method performed by a network device for energy efficient configuration of a physical port of a plurality of physical ports of the network device, wherein the plurality of physical ports are aggregated into a logical port in a logical communication channel between the network device and a device, the method comprising:
    determining a configuration of the plurality of physical ports, the configuration including one or more parameters;
    monitoring the one or more parameters, including determining a number of active links in the logical communication channel;
    comparing the determined number of active links in the logical communication channel to a minimum threshold number of active links;
    if the determined number of active links is less than or equal to the minimum threshold number of active links, selecting a physical port from the plurality of physical ports having a standby port state and modifying a configuration state of the selected physical port from the standby port state to one of an active port state and an active port state with a limited bandwidth utilization rate; and
    if the determined number of active links is greater than the minimum threshold number of active links, determining a bandwidth utilization load of the logical communication channel and comparing the bandwidth utilization load to a removal threshold to determine whether to modify a configure state of one of the plurality of physical ports.

2. The method of claim 1, wherein, prior to comparing the bandwidth utilization load to the removal threshold, the method further comprises:
    if the determined number of active links in the logical communication channel is greater than the minimum threshold number of active links, comparing the determined number of active links to a maximum threshold number of active links; and
    if the determined number of active links is greater than the maximum threshold number of active links, performing the comparison of the bandwidth utilization load of the logical communication channel to the removal threshold to determine whether to modify the configuration state of one of the plurality of physical ports.

3. The method of claim 1, further comprising:
    if the bandwidth utilization load is less than the removal threshold, modifying one of the plurality of physical ports having a configuration state of an active port state or an active port state with a limited bandwidth utilization rate to a standby port state.

4. The method of claim 1, wherein a parameter of the one or more parameters is a maximum flow threshold, further comprising:
    determining a flow load of one of the plurality of physical ports, the flow load measuring a number of packet flows serviced by the physical port; and
    comparing the flow load to the maximum flow threshold to determine whether to modify the configuration state of the physical port.

5. The method of claim 1, wherein a PHY chip associated with the selected physical port does not support another physical port in an active port state or an active port state with a limited bandwidth utilization rate.

6. The method of claim 1, wherein the selected physical port is incorporated within a blade of a plurality of blades in the network device, the blade includes an inactive switch application-specific integrated circuit (ASIC).

7. The method of claim 1, further comprising:
    determining a number of limited active links in the logical communication channel, wherein the limited active links are links with a limited bandwidth utilization rate, and
    comparing the determined number of limited active links in the logical communication channel to a minimum threshold number of limited active links to determine whether to modify the configuration state of one of the plurality of physical ports.

8. The method of claim 4, wherein the configuration state of the selected physical port is an active port state or an active port state with a limited bandwidth utilization rate if the flow load is less than the maximum flow threshold, and wherein the configuration state of the selected physical port is a standby port state or an active port state with a limited bandwidth utilization rate if the flow load is greater than or equal to the maximum flow threshold.

9. A network device for energy efficient configuration of a physical port of the network device, the network device comprising:

a plurality of physical ports to receive packets, wherein the plurality of physical ports are aggregated into a logical port in a logical communication channel;

a PHY chip coupled to at least one of the plurality of physical ports;

a switch application-specific integrated circuit (ASIC) coupled to the PHY chip; and an energy savings module coupled to the switch ASIC, wherein the energy savings module is to:

determine a configuration of the plurality of physical ports, the configuration including one or more parameters;

monitor the one or more parameters, including a determination of a number of active links in the logical communication channel;

compare the determined number of active links in the logical communication channel to a minimum threshold number of active links;

if the determined number of active links is less than or equal to the minimum threshold number of active links, select a physical port from the plurality of physical ports having a standby port state and modify a configuration state of the selected physical port from the standby port state to one of an active port state and an active port state with a limited bandwidth utilization rate; and if the determined number of active links is greater than the minimum threshold number of active links, determine a bandwidth utilization load of the logical communication channel and compare the bandwidth utilization load to a removal threshold to determine whether to modify a configure state of one of the plurality of physical ports.

10. The network device of claim 9, wherein a PHY chip associated with the selected physical port does not support another physical port in an active port state or an active port state with a limited bandwidth utilization rate.

11. The network device of claim 9, wherein the selected physical port is incorporated within a blade of a plurality of blades in the network device, the blade includes an inactive switch application-specific integrated circuit (ASIC).

12. The network device of claim 9, wherein the energy savings module is further to:

determine a number of limited active links in the logical communication channel, wherein the limited active links are links with a limited bandwidth utilization rate, and compare the determined number of limited active links in the logical communication channel to a minimum threshold number of limited active links to determine whether to modify the configuration state of one of the plurality of physical ports.

13. A non-transitory computer-readable medium storing a plurality of instructions for energy efficient configuration of a physical port of a plurality of physical ports of a network device, wherein the plurality of physical ports are aggregated into a logical port in a logical communication channel between the network device and a device, the plurality of instructions comprising code to cause a data processor to:

determine a configuration of the plurality of physical ports, the configuration including one or more parameters;

monitor the one or more parameters, including a determination of a number of active links in the logical communication channel;

compare the determined number of active links in the logical communication channel to a minimum threshold number of active links;

if the determined number of active links is less than or equal to the minimum threshold number of active links, select a physical port from the plurality of physical ports having a standby port state and modify a configuration state of the selected physical port from the standby port state to one of an active port state and an active port state with a limited bandwidth utilization rate; and if the determined number of active links is greater than the minimum threshold number of active links, determine a bandwidth utilization load of the logical communication channel and compare the bandwidth utilization load to a removal threshold to determine whether to modify a configure state of one of the plurality of physical ports.

14. The non-transitory computer-readable medium of claim 13, wherein the plurality of instructions further comprise code to cause the data processor, prior to comparing the bandwidth utilization load to the removal threshold, to:

if the determined number of active links in the logical communication channel is greater than the minimum threshold number of active links, compare the determined number of active links to a maximum threshold number of active links; and if the determined number of active links is greater than the maximum threshold number of active links, perform the comparison of the bandwidth utilization load of the logical communication channel to the removal threshold to determine whether to modify a configuration state of one of the plurality of physical ports.

15. The non-transitory computer-readable medium of claim 13, wherein the plurality of instructions further comprise code to cause the data processor to:

if the bandwidth utilization load is less than the removal threshold, modify one of the plurality of physical ports having a configuration state of an active port state or an active port state with a limited bandwidth utilization rate to a standby port state.

16. The non-transitory computer-readable medium of claim 13, wherein a parameter of the one or more parameters is a maximum flow threshold and wherein the plurality of instructions further comprise code to cause the data processor to:

determine a flow load of one of the physical ports, the flow load measuring a number of packet flows serviced by the physical port; and compare the flow load to the maximum flow threshold to determine whether to modify a configuration state of the physical port.

17. The non-transitory computer-readable medium of claim 13, wherein the plurality of instructions further comprise code to cause the data processor to:

determine a number of limited active links in the logical communication channel, wherein the limited active links are links with a limited bandwidth utilization rate, and compare the determined number of limited active links in the logical communication channel to a minimum threshold number of limited active links to determine whether to modify the configuration state of one of the plurality of physical ports.

18. The non-transitory computer-readable medium of claim 16, wherein the configuration state of the selected physical port is an active port state or an active port state with a limited bandwidth utilization rate if the flow load is less than the maximum flow threshold, and wherein the configuration state of the selected physical port is a standby port state or an active port state with a limited bandwidth utilization rate if the flow load is greater than or equal to the maximum flow threshold.

* * * * *